Aug. 22, 1967   L. D. NINNEMAN   3,337,667
METHOD OF MAKING PLASTIC ARTICLES
Filed July 19, 1965   7 Sheets-Sheet 1

Inventor.
LAWRENCE D. NINNEMAN
By Philip M. Rice
& W. A. Schaich
ATT'YS.

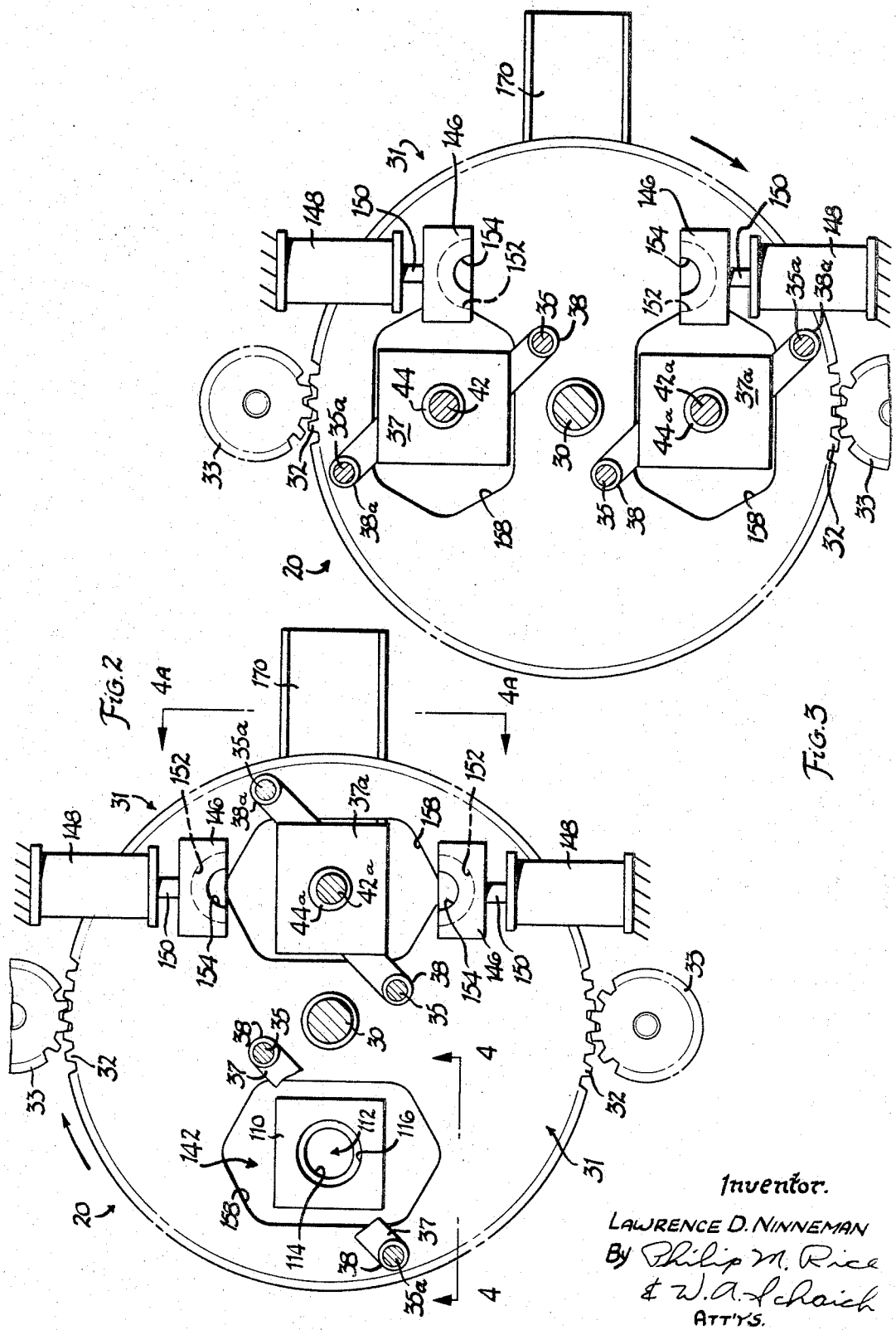

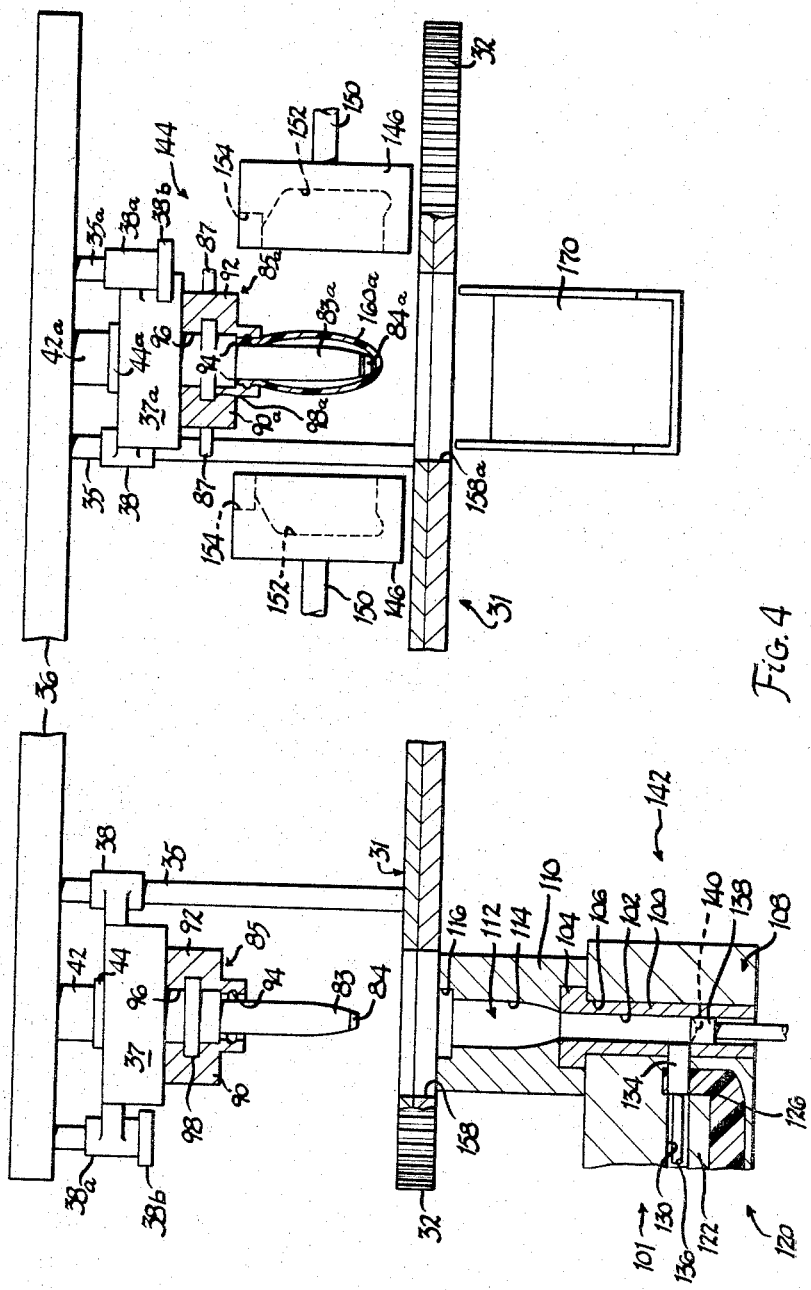

Aug. 22, 1967 L. D. NINNEMAN 3,337,667
METHOD OF MAKING PLASTIC ARTICLES
Filed July 19, 1965 7 Sheets-Sheet 4

Inventor.
LAWRENCE D. NINNEMAN
By Philip M. Rice
& W. A. Schaich
ATT'YS.

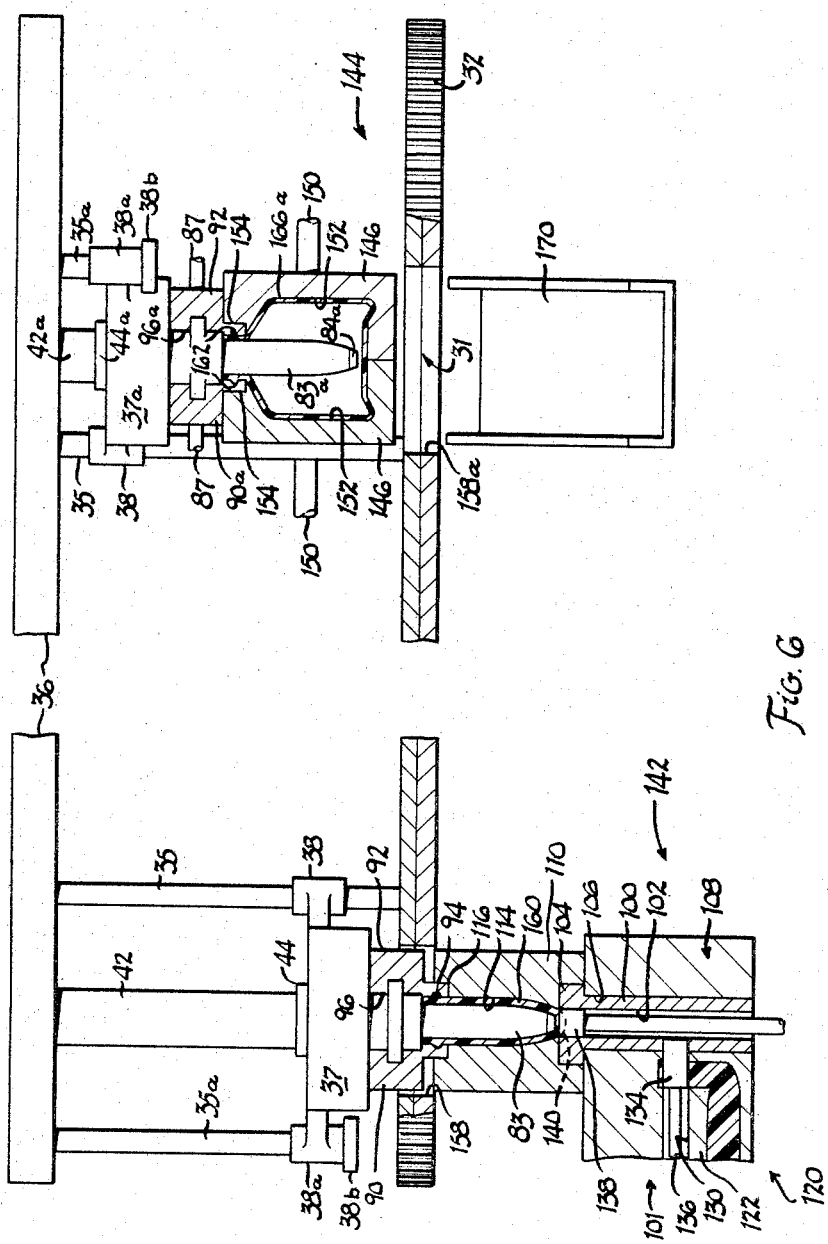

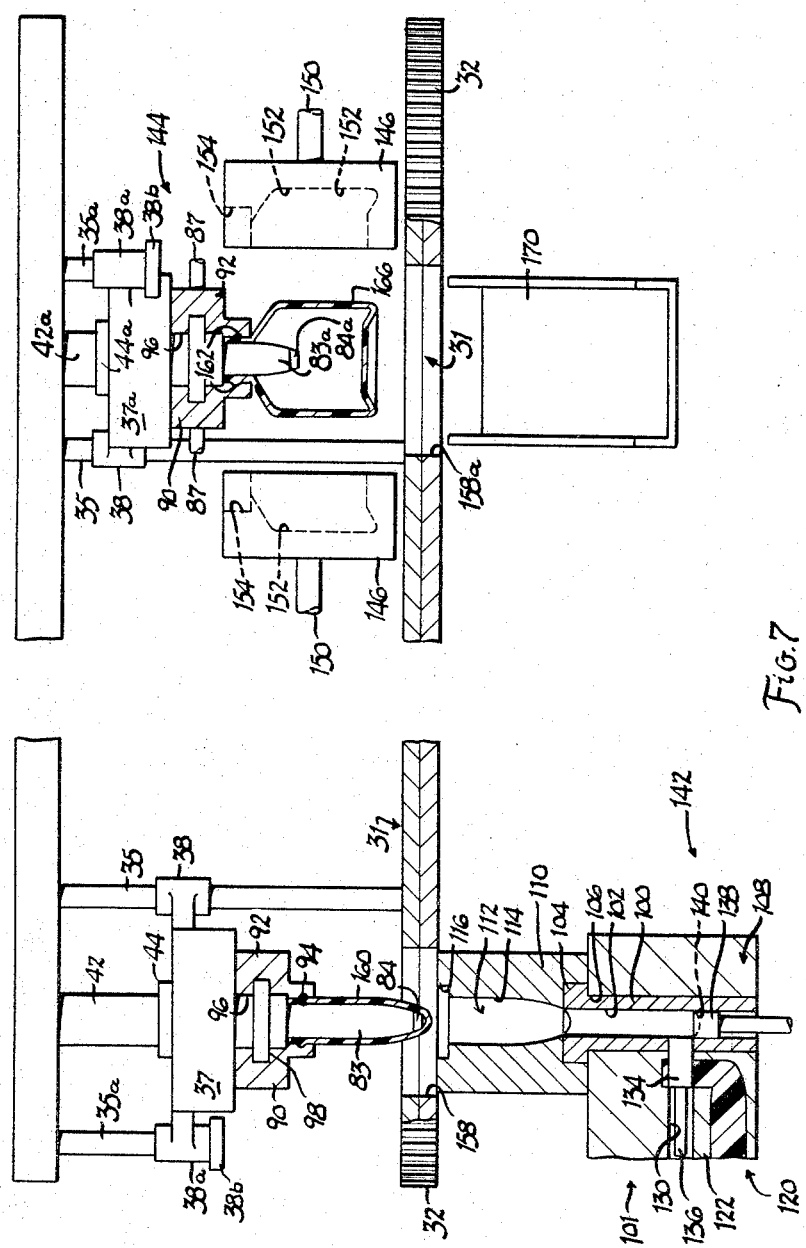

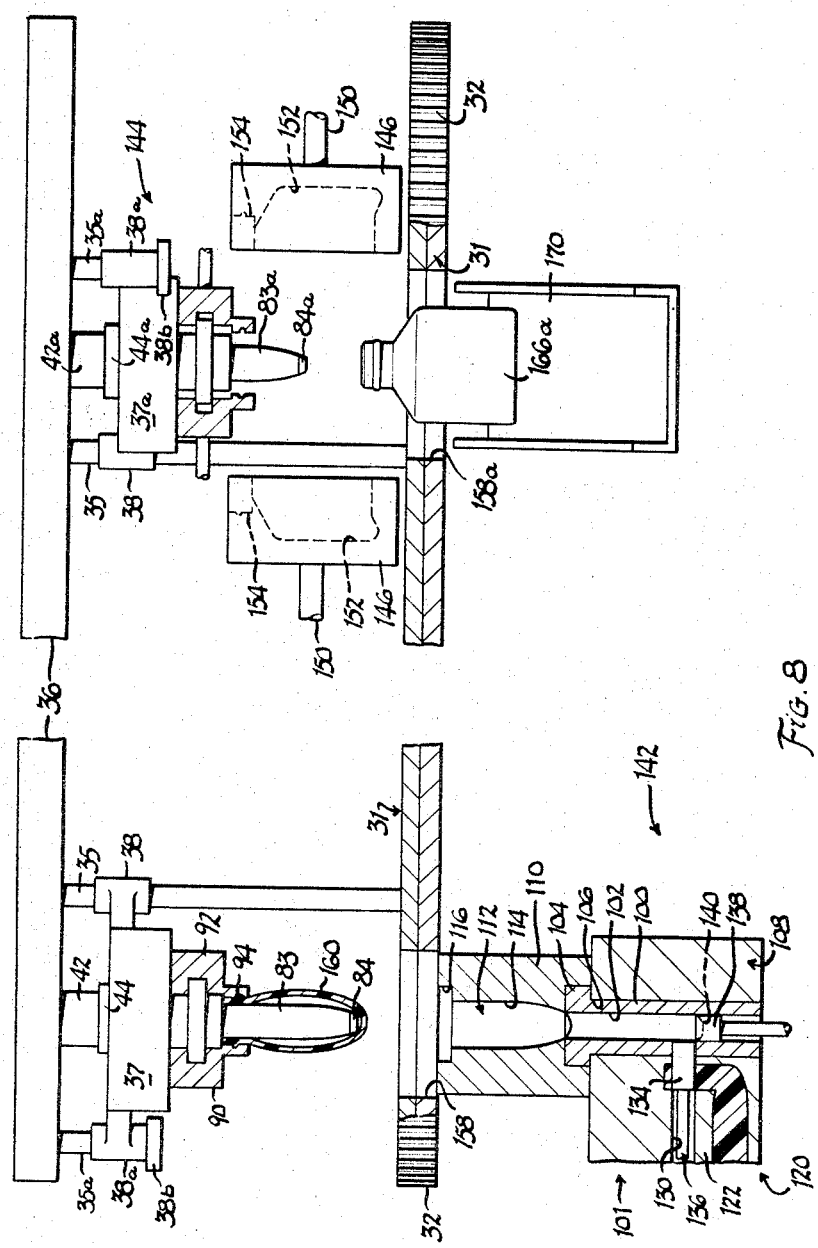

United States Patent Office 3,337,667
Patented Aug. 22, 1967

3,337,667
METHOD OF MAKING PLASTIC ARTICLES
Lawrence D. Ninneman, Toledo, Ohio, assignor to Owens-Illinois, Inc., a corporation of Ohio
Filed July 19, 1965, Ser. No. 472,864
3 Claims. (Cl. 264—97)

The present invention relates to a method of making plastic articles, such as blown plastic containers, by combined injection molding and blow molding operation, the injection molding and blow molding portions of the method being carried out at separate, stationary locations.

More particularly, the present invention relates to a method of making plastic articles by an overlapped process requiring a minimum of tooling expense and accommodating rapid and inexpensive changes in the articles being produced by utilizing (in the case of blown plastic containers) a pair of neckmolds which are shuttled between separate, stationary parison-forming and blow molding stations at which parison-forming and blow molding operations are concurrently carried out on the respective neckmolds.

In the development of machines and processes for manufacturing blow molded plastic articles, particularly containers, many different types of machines and processes have been proposed. Typically, commercial production is carried out upon multiple-station machines, such as that illustrated in United States Letters Patent No. 3,008,192, wherein the parison is formed and then enclosed in a blow mold which is idle during the parison formation, the parison forming operation being idle during the blow molding operation.

Alternatively, machines have been developed wherein a rotary or oscillating table is utilized to convey the formed parisons from the forming location to a remote blowing-cooling location. Even here, however, each parison is provided with its own blow mold, and substantial initial tooling investments and prolonged and expensive change-over periods are involved when production is switched from one type or design of container to another type or design.

The present invention now proposes a different approach to this problem, wherein the parison-forming and blow molding operations are carried out at separate stations between which a neckmold or the like is shuttled, a pair of such neckmolds being utilized so that the blow molding of a previously formed parison can be carried out while the next successive parison is being formed. Thus, only a single blow mold is required for two neckmolds, and the only changeover which is required between individual containers is the substitution of a specific blow mold for a previously utilized blow mold, together with whatever changes at the single parison-forming station may be required. This is possible since the necks or "finishes" of containers are fairly well standardized to accommodate standard closures, standardized filling equipment, and the like. Thus, substantial savings in the expense and time of production changes can be obtained by practicing the method of the present invention.

Generally, this invention includes an apparatus having an arcuately movable (i.e., a rotatable or oscillatable) plate or turntable supported by a machine frame for displacement relative (1) to a fixed parison station in which the parison is formed and (2) to a fixed blow mold in which the parison is blow molded. The plate carries a pair of neck mold assemblies, each having a cavity conforming to the contour of the container finish or other injection molded article portion. If an injection molded parison is to be utilized, the neck mold assemblies include depending core pins about which the preform is to be injection molded, and each neck mold provides means for accommodating inflation of the preform at the blowing station. Each of the injection neck mold assemblies is vertically movable relative to the plate so that it can be actuated downwardly through a plate aperture at a fixed parison-forming station.

After the parison is formed, the neckmold assembly is elevated to position the parison above the plate, and the plate is arcuately displaced to position the parison in alignment with partable blow mold sections at a fixed blowing station. This displacement of the plate also positions a second neck mold assembly carried by the plate in vertical alignment with the same fixed parison station. The blow mold sections then are closed around the previously formed parison, and blow air is introduced into the parison to inflate it to the final configuration of the body of the container.

While the first parison is being enclosed within its blow mold and inflated therein, the second neck mold assembly is lowered through a second plate aperture into cooperative relation with the lower parison forming station and the above described steps of parison formation are carried out to form a second parison.

While the second neck mold assembly remains at the parison-forming station, the first blown article is removed from the blow molds by opening the blow molds, and the container falls through the first plate aperture for gravity removal from the apparatus.

Following the ejection of the finished container, the plate is arcuately displaced or oscillated (1) to realign the first plate aperture and the first neckmold assembly with the parison station and (2) to move the second parison to the fixed blow molding station.

Thus, it will be seen that the formation of a second parison is carried out during the period that a first container is being blown, cooled interiorly of the blow mold and ejected therefrom. The positions of the two neckmold core pin assemblies are merely reversed following ejection of the completed first container, thereby accommodating the formation of a third container parison. In this manner, the operations of parison formation and of blowing, cooling and ejection are carried out sequentially for each container but the operations are carried out simultaneously upon different, successively formed containers.

It is, therefore, an important object of the present invention to provide a new and improved method of manufacturing blown plastic containers by the utilization of parison-forming and blow molding techniques utilized in a highly efficient, overlapped arrangement having spaced, fixed parison forming and blowing stations.

Another important object of this invention is to provide an improved method for the manufacture of a blown plastic container having an injection molded neck, and wherein a plurality of neck mold assemblies are oscillated between fixed forming stations, the mold assemblies being movable to accommodate the formation of a blowable parison at a first fixed station and the subsequent blowing of the parison at a second fixed blow molding station.

It is yet another, and no less important, object of the present invention to provide an improved method for the manufacture of blown plastic articles having injection molded necks wherein a pair of spaced neck molds are shuttled between a fixed parison-forming station and a fixed blowing station to obtain the maximum article production for a minimum tooling cost, since only one blow mold and only one parison station can service the pair of neck molds in a completely overlapped forming cycle.

These and other objects and features of this invention will become more fully apparent from the following description and appended claims, reference being had to the accompanying drawings wherein:

FIGURE 2 is a schematic plan view of the apparatus at a reduced scale, taken along the plane 2—2 of FIGURE 1, illustrating the machine in a first oscillated position;

FIGURE 3 is a view similar to FIGURE 2 but with the machine oscillated 90 degrees through its travel path from one forming station to another;

FIGURE 4 is an enlarged fragmentary sectional view taken jointly along the plane 4—4 and plane 4A—4A of FIGURE 2, illustrating a first method step performed at each forming station; and FIGURES 5 through 8, inclusive, are views similar to FIGURE 4 illustrating later sequential method steps.

General assembly

Figure 1:
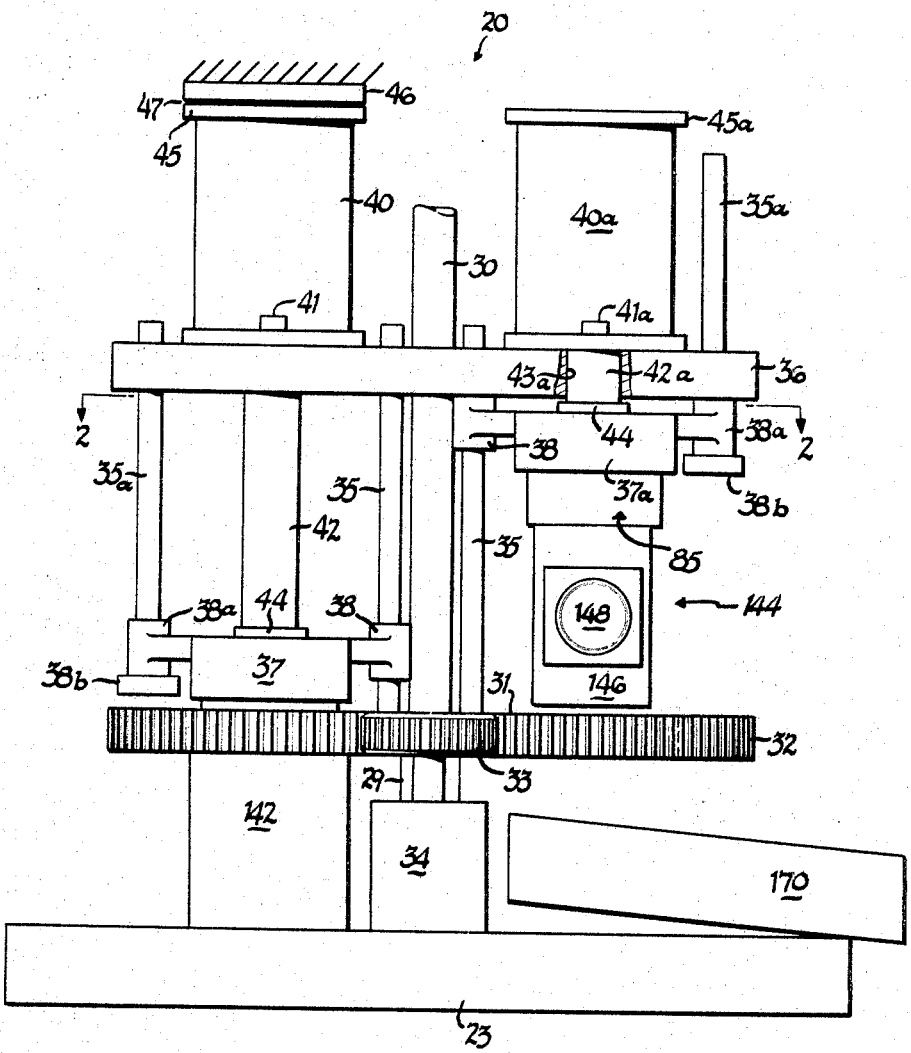
FIGURE 1 is a fragmentary side elevational view, with parts broken away, of an apparatus capable of carrying out the method of this invention.

In FIGURE 1 the reference numeral 20 indicates generally a 2-station oscillating apparatus of the present invention supported on a frame (not shown) and comprising a base plate 23 and a vertically extending centrally located shaft 30 journaled for free rotation in appropriate bearings, for example, bearing 29 located centrally on and surmounting the base plate 23.

Secured to the freely rotatable shaft 30 is a radially extending, arcuately actuable table (indicated generally at 31) circumscribed by a ring gear 32. The table 31 and the surrounding ring gear 32 are spaced vertically above and extend parallel to the base plate 23. This ring 32 meshes with a pair of pinions 33 rotationally driven by suitable means, as by hydraulic motors 34. Obviously, rotation of the pinion 33 by means of the motors 34 will cause the table 31 to move arcuately by engagement of the pinions 33 with the ring gear 32. An upper plate 36 of substantially the same size and configuration as the table 31 is movable with the table.

Extending between the table 31 and the upper plate 36 is a pair of vertically upstanding inboard posts 35 which serve to guide a pair of vertically movable neck ring crossheads 37 and 37a which are identical in construction and configuration. These crossheads 37, 37a are each provided with laterally spaced, vertically projecting sleeves 38 integral with the crossheads and serving to guide the crossheads for vertical displacement on the rods 35. Each crosshead has a second such sleeve 38a encircling a second post 35a which is vertically movable in a slide bushing (not shown) carried by the plate 36. These second posts terminate in abutment blocks 38b which contact the undersurface of the heads 37, 37a. Thus, the posts 35a move with the heads and are guided by the bearing bushings in the plate 36.

The crossheads are actuated vertically for independent movement relative to one another and relative to the table 31 by means of fluid pressure actuated cylinders 40 which are carried by the upper surface of the top plate element 36 (being mounted thereon by bolts 41) to project freely vertically thereabove. The piston rods 42 of the cylinders 40 project vertically downwardly through apertures 43 in the plate 36 for attachment through attaching blocks 44 to the crossheads 37, 37a, respectively.

It will be noted that each of the upper ends of the cylinders 40 terminates in a movable abutment block 45. The frame (not shown) carries a fixed abutment block 46 which is located in alignment with a lower parison mold block 142. Further, it will be noted that the upper surface of each of the abutments 45 carried by the cylinders 40 is at an elevation slightly spaced from the elevation of abutment blocks 46, the slight distance being indicated at 47. This distance is on the order of a few thousandths of an inch. Upon actuation of either of the cylinders 40 to extend the piston rods 42 thereon downwardly, as will be hereinafter explained, the crosshead 37 is actuated downwardly against a fixed abutment. When this abutment is encountered, the compression force in the piston rods 42 tends to displace the corresponding cylinder 40 vertically upwardly through the space 47. The upper plate 36 of the rotatable carriage is of relatively light construction, in order to reduce the over-all arcuate momentum of the carriage assembly, and this plate 36 can deflect vertically upwardly through at least the dimension 47, so that the abutment block 45 of the one cylinder abuts the aligned block 46. Thus, the clamping load imposed on the corresponding piston rod 42 is transferred to the massive frame (not shown) and this clamping load need not be borne by the rotatable carriage.

One specific structure of the crossheads 37 is particularly disclosed in co-pending United States application Ser. No. 410,343, assigned to the assignee of this invention. While the figures of the present application depict only a single injection mold-core pin assembly carried by each crosshead, two or more such assemblies could be so carried in a like manner, as shown and described in said co-pending application.

One or more core pins 83 are carried by each crosshead 37 for relative reciprocable movement thereto by actuation of a core pin cylinder (not shown). Injection mold core pin 83 may be of any exterior shape and will generally be provided with temperature control means for heating and/or cooling the pin. Each core pin is equipped with a selectively openable lower valve 84 to accommodate inflation of a parison for purposes hereinafter explained.

Each pin 83 is interposed between a partable neck or injection finish mold 85, the sections of which are rectilinearly displaceable in a generally horizontal plane by cylinders (not shown) through piston rods 87 or by camming surfaces (not shown), as set forth in said co-pending application, Ser. No. 410,343. Each partable neck mold or finish mold 85 comprises sections 90 and 92 which have semicylindrical interior faces 94 contoured to define the threaded finish of the final container and positioned adjacent but in radially spaced relation to the exterior surface of core pin 83. These neckmold sections 90 and 92 are, as stated, transversely movable (as viewed in FIGURES 4 through 8) relative to the pin 83 and also relative to a neckmold guide ring 96 fixed to the upper portion of the pin 83, the ring 96 having a surrounding flange 98 guiding the neckmold sections 90 and 92 for transverse movement.

As best illustrated in FIGURES 4 through 8 of the drawings, and also referring to FIGURE 1 of the drawings, there is interposed between the table 31 and the base plate 23 of the machine a parison forming station 142. This station 142 includes a parison mold 110 communicating with a vertical, tubular supply conduit 100 constituting part of a feed system 101. The conduit 100 has a central passage 102 therethrough and is provided with an upper peripheral flange 104 overlying the bore 106 of a supply block 108. The conduit 100 is surmounted by the parison mold 110, the stationary parison mold surrounding a mold cavity 112 adapted to receive therein one of the core pins 83. When one of the core pins 83 is inserted into the cavity 112 (FIGURE 5) a tapered portion 114 of the cavity receives the pin 83 and the neckmold 85 is seated in a recess portion 116 of the cavity.

Figure 5:
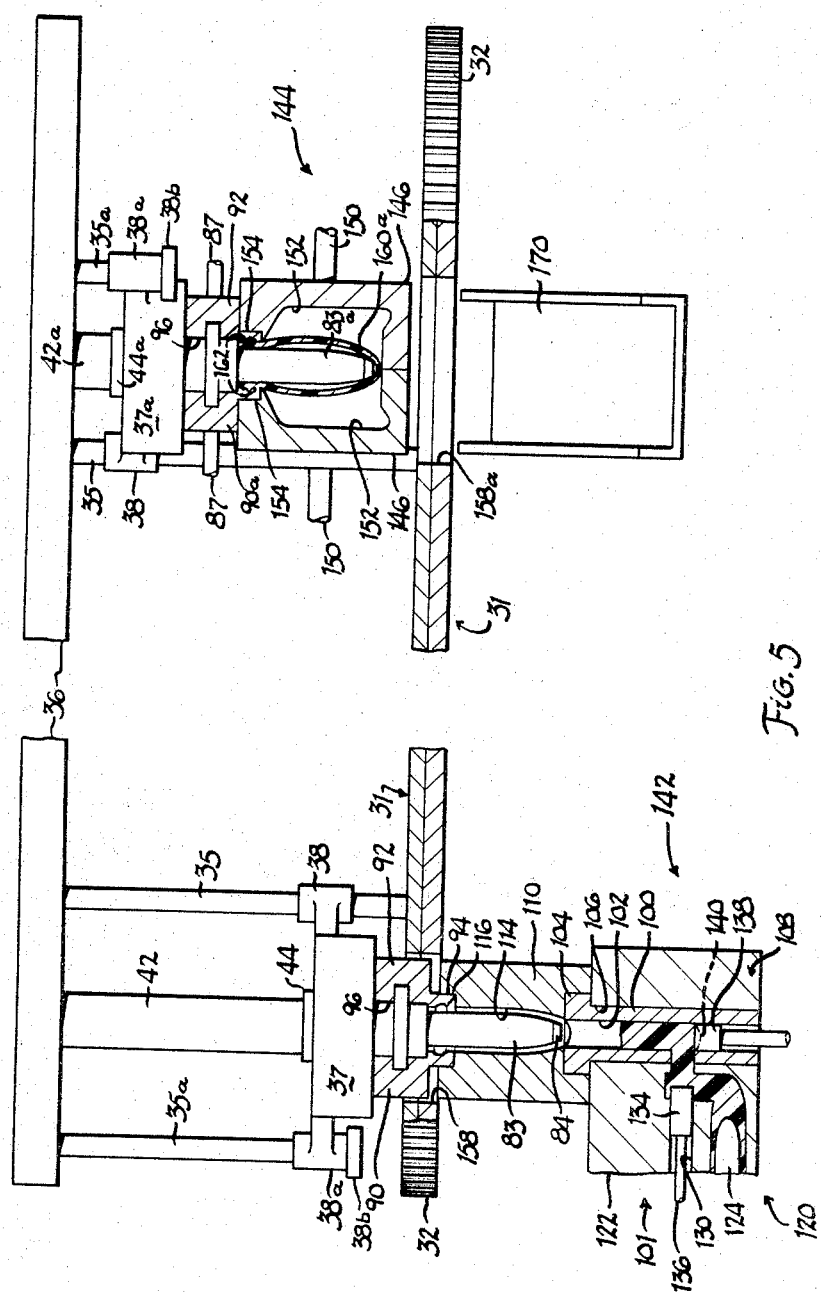

A plasticizer-extruder 120 supplies plasticized material to the conduit 110 through a supply block 122 enclosing an axially reciprocable accumulator piston 124 (FIGURE 5). An interior accumulator space in the block 122 communicates at its forward end, as at 126, through a valve bore 130 with the passage 102.

Positioned in the bore 130 is a valve 134 for opening and closing the bore in timed relation to accommodate delivery of a charge of material to the passage 102 and to purge plasticized material from the bore 130 at closing. The valve 134 is actuated through a rod 136. An injection ram 138, having a recess 140 corresponding to the lower tip of the parison mold cavity 114, is reciprocated by power means (not shown) to introduce into the cavity 114 the charge of material deposited in the passage 102, thus injection molding a parison 160 in the annular space between the parison mold cavity and the pin 83, and in the neckmold cavity.

Secured to the machine frame (not shown) in a fixed position and closely overlying the table 31 is a blow molding station 144 which is diametrically opposed to the parison forming station 142.

The station 144 comprises a pair of partable blow mold sections 146 movable between the open and closed positions (FIGURES 3 and 2), respectively, by a pair of cylinders 148 having piston rods 150 secured to the blow mold sections 146. These blow mold sections 146 are open-topped and each has an interior cavity or recess defining one-half of the blow molded portion of the article to be formed, so that when the two blow mold sections are moved into abutment with one another (from the position of FIGURE 4 to that of FIGURE 5) the two recesses 152 cooperatively define an interior, open-topped blow mold cavity conforming to the shape of the body or blown portion of a container being manufactured. The upper edges of the blow mold sections 146 are recessed, as at 154, to receive therein the neck mold sections 90 and 92 which have been heretofore described.

Operation

The operation of the apparatus of the present invention will be apparent from a study of FIGURES 4 through 8, inclusive.

Assuming that the apparatus has been operating in a recurrent cycle, it will be seen that the one crosshead 37 is lowered from the position of FIGURE 4 to that of FIGURE 5 to insert the associated parison core pin 83 thereof through the plate aperture 158 into the parison mold recess 114 of the lower parison mold block 110, as seen in FIGURE 5.

Additionally, it will be noted that the parison mold 112 has an upper, relatively shallow recess 116 into which the neckmold 85 depends in firmly seated and bottomed relation under the pressure of the force of the cylinder 40 exerted on the cylinder rod 42. In this position the cylinder 40 (FIGURE 1) will have moved upwardly slightly through the distance 47 moving the blocks 45 and 46 into fixed engagement, thereby prohibiting relative movement of the core pin 83 and the neckmold 85 within the parison mold cavity 114.

The blow mold sections 146 are closed at the same time by their actuating cylinders 148 to enclose therein a previously formed parison 160a at the crosshead 37a.

When the left crosshead 37 (as viewed in FIGURES 4 through 8) is thus positioned, the plasticizer-extruder accumulator piston 124 is advanced to the right and the valve 134 is retracted by its cylinder so that a metered charge of plasticized material passes through the passage 130 and is accumulated in the passage 102. Thereafter, the valve 134 is advanced to purge the passage 130 of plasticized material and the ram 138 is advanced to inject the metered charge of plasticized material into the parison mold cavity at 114, as depicted in FIGURE 6. This charge also fills the neck mold space defined between the surfaces 94 of neck mold sections 90 and 92 and the core pin 83. Following the filling of the parison mold space, a complete parison 160 (FIGURE 6) has been formed about the core pin 83, this parison including the integrally formed injection molded neck.

At the same time, air or like fluid under pressure is introduced into the parison 160a, located at the blow molding station 144, through the lower valve 84 of the core pin 83. This expands the parison 160a against the mold cavity 152 to form a container 166a (see FIGURE 6).

As the mold space at 114 is being filled, the accumulator piston 124 is actuated to the left, either by means of internal pressure or by means of external power source, to accumulate the next successive storage of plasticized material.

Following the completion of the injection molding operation, the left head 37 dwells for a relatively short, predetermined time in its lowered position of FIGURE 6 until such time as the plasticized material has set to a substantially self-sustaining state when supported upon the core pin 83. This time allows the container 166a to cool within the blow mold sections 146, the sections being supplied with cooling water through internal passage (not shown), if desired.

Next, the lowered head 37 is elevated by means of the cylinder 40 and the cylinder rod 42 to strip the injection molded parison 160 from the parison mold 112. The parison mold block 110 may be of one-piece unitary construction or may be made in two laterally separable sections to aid in such stripping motion, if desired. The head 37 is depicted in FIGURE 7 as it is being elevated, and is illustrated in the completely elevated position in FIGURE 8.

As illustrated in FIGURE 7, as the left crosshead 37 is elevated, the partable blow molds 146 are opened by actuation of the cylinders 148 and thereafter the core pin 83a is retracted by its cylinder (not shown), which cylinder is housed within the right crosshead 37a.

This elevation of the left lowered crosshead 37 results in the injection molded parison 160 being moved upwardly through the left plate aperture 158. As the parison 160 is elevated a small volume of air may be introduced into the parison to "puff" or partially inflate it. Just prior to the left crosshead assuming the position of FIGURE 8, the right neck ring sections 90a and 92a are opened by cylinder or cam means allowing the container 166a to fall by force of gravity from the right core pin 83a upon a removal chute 170 or the like. The neck mold sections 90a and 92a are then closed and the core pin 83a is again extended.

Thus, with the apparatus 20 positioned as seen in FIGURE 8, one molding cycle has been completed, and the machine is in readiness for commencement of another cycle. To initiate the next cycle, the table 31 is rotated through 180° in response to energizing of the motors 34 and the rotation of the pinion gears 33 in mesh with the ring gear 32. Thus, the positions of the crossheads 37, 37a are reversed with the apparatus 20 otherwise taking the position shown in FIGURE 4, from whence the foregoing operation is repeated. The next successive operation will take place by rotating the plate 31 or by reversely oscillating the plate 31. The head assemblies, core pin and neck ring assemblies, and all of the remainder of the apparatus mounted thereon therefor, oscillate or rotate between the two forming stations 142, 144 which are arcuately spaced through an angle of 180°.

It is to be understood that the invention is not limited in its application to the details of construction and arrangement of parts illustrated in the accompanying drawings, since the invention is capable of other embodiments and of being practiced or carried out in various ways. Therefore, the foregoing description is to be considered exemplary rather than limiting, and the true scope of the invention is that defined in the following claims.

I claim:

1. In a continuous method of making plastic containers having a blow molded body by the utilization of two neckmold and parison core pin units spaced diametrically from each other on a rotatable horizontal table and by the further utilization of a parison molding station at one location below said table and a blow molding station at another location above said table and spaced horizontally from said parison molding station, the steps of
(1) lowering a first neckmold and parison core pin units through an opening in said table to said parison molding station, (2) filling said first neckmold with plastic and molding a blowable plastic parison about the first parison core pin at said parison molding station, (3) raising said first neckmold and parison core pin unit with said parison through said opening to a position above said table in horizontal alignment with said blow molding station;

while at the same time (4) enclosing a previously formed blowable parison carried by the second neckmold and parison core pin unit within a blow mold at said blow molding station, (5) blow molding the previously formed blowable parison into a blown container body integral with material in the neckmold of said second unit, and (6) cooling and thereafter ejecting the container;

(7) horizontally rotating said table through 180° to move said first neckmold and parison core pin unit with said parison to said blow molding station and to move said second neckmold and parison core pin unit to a position above said parison molding station; and (8) carrying out steps (1) through (3) at said second neckmold and parison core pin unit and carrying out steps (4) through (6) at said first neckmold and parison core pin unit.

2. In a continuous method of making plastic containers having a blow molded body by the utilization of two neckmold and parison core pin units spaced diametrically from each other on a rotatable horizontal table and by the further utilization of a parison molding station at one location below said table and a blow molding station at another location above said table and spaced horizontally from said parison molding station, the steps of (1) positioning said table to place a first neckmold and parison core pin unit in vertical alignment with said parison molding station and to place the second neckmold and parison core pin unit at said blow molding station, (2) lowering said first neck mold and parison core pin unit through an opening in said table to said parison molding station, (3) filling said first neckmold with plastic and molding a blowable plastic parison about the first parison core pin at said parison molding station, (4) raising said first neckmold and parison core pin unit with said parison through said opening to a position above said table and in horizontal alignment with said blow molding station, (5) horizontally rotating said table through 180° to move said first neckmold and parison core pin unit with said parison to said blow molding station and to move said second neckmold and parison core pin unit to said position above said parison molding station, (6) enclosing said parison within a blow mold at said blow molding station, (7) blow molding said parison into a blown container body integral with material in said first neckmold, and (8) cooling and thereafter ejecting said container at said blow molding station, steps (6) through (8) being carried out with respect to said first neckmold and parison core pin unit at said blow molding station while the foregoing steps (2) through (4) are carried out with respect to said second neckmold and parison core pin unit at said parison molding station.

3. In a method of making plastic containers having a blow molded body and an injection molded neck, the steps of (1) positioning a rotatable horizontal table carrying first and second neckmold and parison core pin units spaced diametrically from each other to place said first unit above a parison molding station below said table and to place said second unit at a blow molding station above said table and spaced horizontally from said parison molding station;

(2) lowering said first unit through an opening in said table to said parison molding station, (3) filling said first neckmold with plastic and molding a blowable plastic parison about the first core pin by injection molding at said parison molding station, (4) raising said first unit with said parison through said opening to a position above said table in horizontal alignment with said blow molding station;

while simultaneously with steps (2), (3) and (4), (5) enclosing a previously formed blowable plastic parison carried by the second neckmold and parison core pin unit within a blow mold at said blow molding station, (6) blow molding the previously formed parison into a blown container body integral with material in the neckmold of said second unit, and (7) cooling and thereafter ejecting the container;

(8) horizontally rotating said table through 180° to move said first neckmold and parison core pin unit with said parison to said blow molding station and to move said neckmold and parison core pin unit to said position above said parison molding station; and (9) carrying out steps (2) through (4) at said second unit and carrying out steps (5) through (7) at said first unit.

References Cited

UNITED STATES PATENTS

| | | | |
|---|---|---|---|
| 2,715,751 | 8/1955 | Weber | 264—97 |
| 2,853,736 | 9/1958 | Gussoni | 264—97 |
| 3,116,516 | 1/1964 | Moslo | 18—5 |
| 3,170,970 | 2/1965 | Adams | 264—97 |

FOREIGN PATENTS

| | | |
|---|---|---|
| 165,061 | 12/1953 | Australia. |
| 231,200 | 11/1960 | Australia. |

ROBERT F. WHITE, *Primary Examiner.*

R. B. MOFFITT, *Assistant Examiner.*